Dec. 18, 1962 M. FRÖLICH 3,069,143
DEEP COOLING APPARATUS
Filed March 25, 1959 2 Sheets-Sheet 1

Inventor:
MARTIN FRÖLICH.
By K. A. Mayr
Attorney.

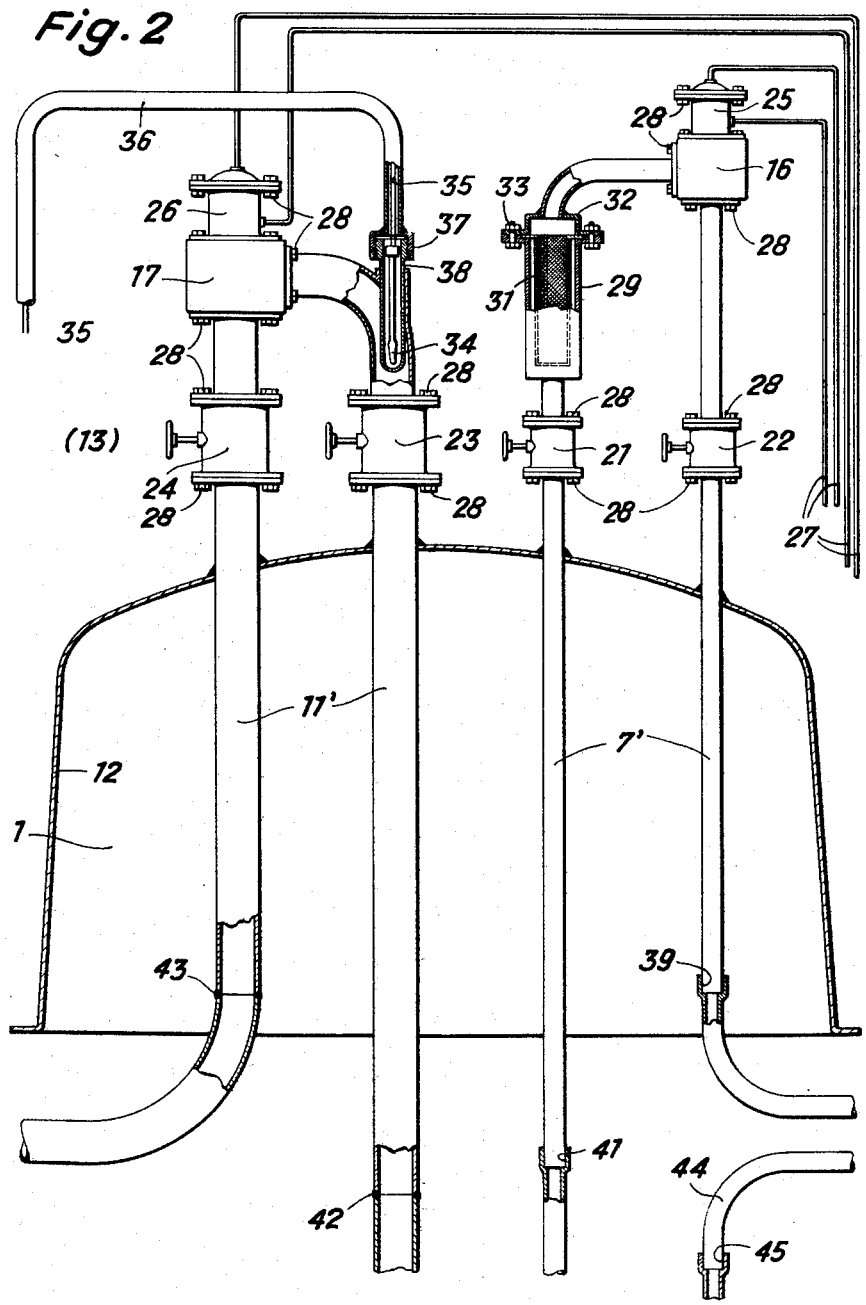

3,069,143
DEEP COOLING APPARATUS
Martin Frölich, Raterschen, Zurich, Switzerland, assignor to Sulzer Freres, S.A., Winterthur, Switzerland, a corporation of Switzerland
Filed Mar. 25, 1959, Ser. No. 801,780
Claims priority, application Switzerland Mar. 28, 1958
9 Claims. (Cl. 165—72)

The present invention relates to an apparatus for deeply cooling a gas which is difficult to liquefy, for example oxygen, hydrogen, nitrogen, helium. The apparatus includes a high vacuum container, in which the pressure is in the order of $10^{-3}$ mm. Hg, for heat insulation of low temperature parts of the plant.

In the apparatus according to the invention an auxiliary vacuum container is connected to the main vacuum container, the pressure in the auxiliary container being between $10^{-3}$ mm. Hg and $10^2$ mm. Hg. The auxiliary container accommodates such parts of the apparatus which are interposed in and mechanically disconnectably connected to conduits extending into the main high vacuum container, the latter containing exclusively such parts which are rigidly and permanently connected to conduits. Mechanically disconnectable connections referred to in the present specification and claims are screw connections, bayonet seals and bayonet-like connections, flange connections, clamp connections, plug connections and the like. Permanent connections referred to in the specification and claims are, inter alia, weldings and solderings. The auxiliary container receives, for example, elements which must be manipulated and serviced or frequently examined and sometimes replaced, filters having exchangeable filter elements or filter elements which must be cleaned or filter containers which must be cleaned, absorption devices having absorbing cartridges which must be renewed from time to time, and the like. The main high vacuum container receives, for example, elements which require less checking, particularly heat exchangers, expansion turbines which elements are welded or soldered to the coolant conduits or to conduits conducting medium to be cooled.

With the arrangement according to the invention maintenance of a high vacuum for heat insulating parts of the plant is facilitated because the high vacuum receptacle contains only perfectly tight permanent connections so that there is no gas leakage. All parts of the plant which are mechanically disconnectably connected to other parts are placed in an auxiliary vacuum container. The relatively low vacuum in the latter can be maintained also if gas leaks thereinto.

With the apparatus according to the invention the high vacuum need not be disturbed when replacing or examining devices and fittings which are disconnectably connected to other parts so that the elements placed in the high vacuum container, as the heat exchangers and others, need not be exposed to the outside temperature. Interruptions of normal operation of the apparatus are, therefore, shortened or avoided.

The novel features which are considered characteristic of the invention are set forth with particularity in the appended claims. The invention itself, however, and additional objects and advantages thereof will best be understood from the following description of embodiments thereof when read in connection with the accompanying drawing, in which:

FIG. 2 is a diagrammatic part sectional elevation of a modified portion of a plant according to the invention.

Figure 1:
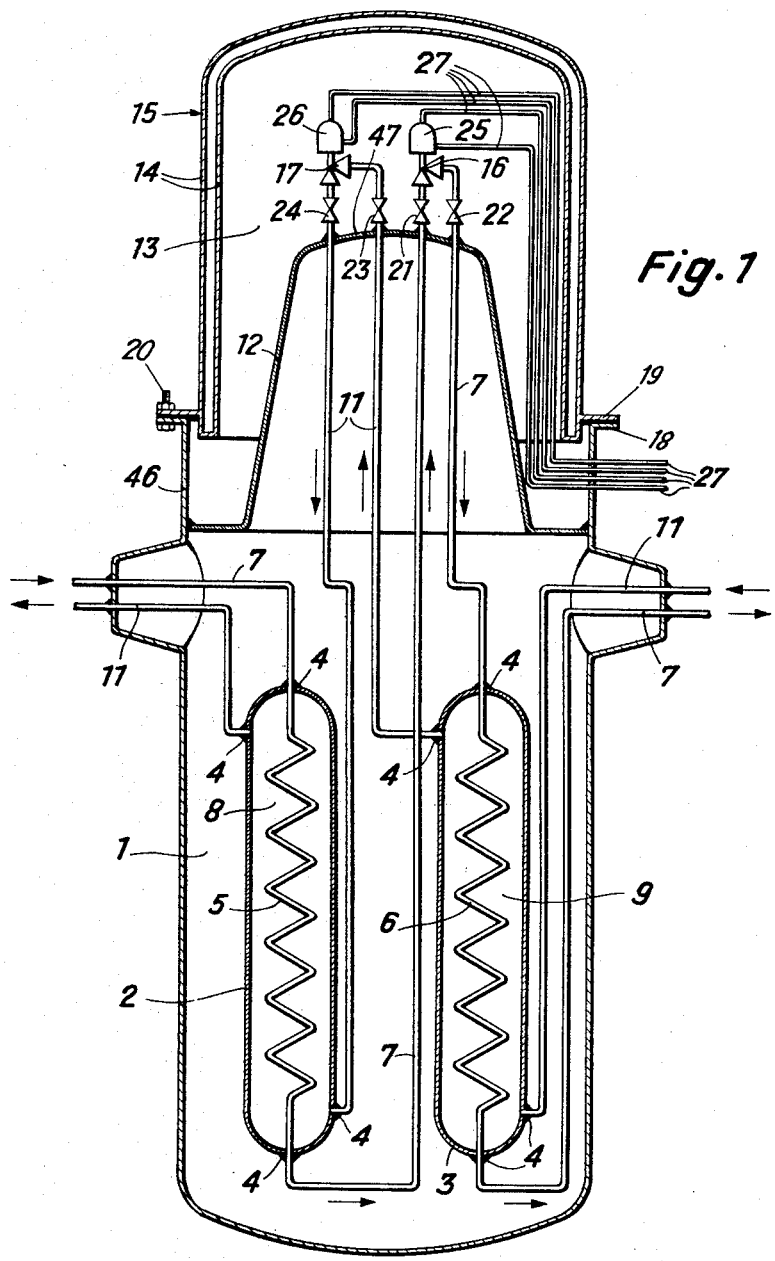
FIG. 1 is a diagrammatic sectional elevation of a portion of a gas liquefying plant according to the invention.

Referring more particularly to the drawing, numeral 1 designates a potlike high vacuum container in which two heat exchangers 2 and 3 are placed which form part of a plant for liquefying, for example, hydrogen and whose temperature is very low, for example $-200°$ C. to $-250°$ C. A vacuum of about $10^{-6}$ mm. Hg is maintained in the container 1. Heat exchange pipes 5, 6 are welded at 4 to cylinders 8, 9, respectively, through which the pipes extend. The pipes 5 and 6 are interposed in series relation in a conduit 7 with respect to the flow of the heat exchanging fluid. The cylinders 8, 9 are interposed in consecutive order in a conduit 11. The conduit 7 and the pipes 5 and 6 interposed therein may conduct the relatively cold medium, the medium to be cooled flowing through the conduit 11.

The upper part of the high vacuum container is provided with a conical dome 12 through which extend the conduits 7 and 11 into an auxiliary vacuum container 13 the vacuum in which is about $10^{-2}$ mm. Hg. The major part of the container 13 is formed as a cover 15 having walls 14 forming a jacket wherein a high vacuum is maintained. The lower part of the container 13 is formed by a wall 46 having a flange 18. The cover 15 has a flange 19 removably connected to the flange 18 by bolts 20.

In the portions of the conduits 7 and 11 which are in the auxiliary container 13 control devices, such as throttling or stopping devices 16, 17 and hand valves 21 to 24 are interposed and connected to the conduits by means of screw connections. The elements 16 and 17 are actuated by remotely controlled operators 25, 26, respectively, to which signal conductors 27 are connected. The elements 16, 17 and 25, 26 afford control of the coolant flow through the pipes 5, 6 and of the cooled medium through the cylinders 8, 9 of the heat exchangers 2, 3, from the outside of the containers.

Gas leakage may occur only through the screw connections placed in the auxiliary container 13. No gas leakage is possible in the main container 1 because only permanent connections 4 are placed in the latter.

The conical configuration of the part 12 makes this part particularly rigid even if made of relatively thin material which offers only a very small heat conductivity so that very little heat is conducted from the exterior wall 46 to the top portion 47 of the conical portion 12 and to the conduits 7, 11 welded thereto. As shown in FIG. 1, at least one half of the conical portion 12 extends into the auxiliary vacuum container.

When examining or replacing the elements 16, 17, 25, 26 in the auxiliary vacuum container 13, the cover forming the cover 15 must be removed. Thereupon the control elements 25 and 26 are accessible and if they must only be examined the operation of the plant may continue. The high vacuum in the container 1 is not disturbed. If desired, the valves 21, 22 and/or 23, 24 may be temporarily closed so that also the element 16 and/or 17 may be examined.

In the example shown in FIG. 2 conduits 7', 11' corresponding to the conduits 7, 11 in FIG. 1 may extend through the bell-shaped portion 12 into the high vacuum container 1. Numerals 28 designate screw connections between the elements 16, 17 and 21 to 24 and the conduits 7' and 11' and also between the elements 25, 26 and the elements 16 and 17 as well as between the elements 25, 26 and the signal conductors 27. There is a service device, namely a filter including a container 29, a replaceable filter 31 and a cover 32 interposed in the conduit 7'. The filter 31 can be replaced after disconnection of a flange connection 33. A thermo-element 34 is inserted in the conduit 11'. Electric conduits 35 extend through a pipe 36 which is screwed at 37 to a housing 38 for the thermo-element 34. The thermo-element 34 can be pulled out of the housing 38 after disconnection of the screw connection 37.

In the device shown in FIG. 2 pipe portions are connected within the high vacuum container 1. The conduit 7' includes two hard-solderings 39 and 41 and the conduit 11' includes two weldings 42 and 43. There is an additional conduit 44 in the container 1 which consists of individual pipe sections which are connected by a hard-soldering 45.

The high vacuum container accommodates only permanent connections 4 in FIG. 1 and 39, and 41 to 45 in FIG. 2. The auxiliary vacuum container 13 accommodates such parts of the plant which are mechanically disconnectably connected to conduits 7, 11 in FIG. 1 and 7', 11' and 27 in FIG. 2, or which themselves include disconnectable connections as 33 and 37. The auxiliary container 13 may also accommodate disconnectable connections between pipe sections which do not carry a coolant or cooled medium but through which leakage gas may escape, such as the pipe 36 and the housing 38.

I claim:

1. An apparatus for deep cooling gases which are difficult to liquefy, comprising, in combination, conduit means for a coolant and conduit means for the gas to be cooled, said conduit means having portions placed in heat exchange relation, the heat exchanging portion of one of said conduit means being placed within and permanently leakproof connected to the heat exchanging portion of the second conduit means, at least one of said conduit means having permanently leakproof interconnected parts, a permanently closed high vacuum container containing said portions of said conduit means for heat insulating said conduit means, an auxiliary relatively low vacuum container joined to said high vacuum container, a wall portion common to and permanently leakproof separating said containers, said auxiliary container having a removable part for providing access to the interior of said auxiliary vacuum container, said conduit means having portions extending through said auxiliary container and being permanently leakageproof connected to said common wall portion, and control and service devices interposed in the portions of said conduit means extending through said auxiliary container.

2. An apparatus as defined in claim 1 wherein at least one of said control devices is a valve.

3. An apparatus as defined in claim 1 wherein at least one of said control devices is a thermostat.

4. An apparatus as defined in claim 1 wherein at least one of said service devices is a filter.

5. An apparatus as defined in claim 1 wherein said control and service devices are disconnectably connected to said conduit portions extending through said auxiliary container.

6. An apparatus as defined in claim 1 wherein said auxiliary container has a first wall portion permanently rigidly connected to said high vacuum container and a second wall portion removably connected to said first wall portion.

7. An apparatus as defined in claim 1 wherein said removable part is dome-shaped and said common wall portion includes a conical portion, at least one half of said conical portion extending into said removable part.

8. An apparatus as defined in claim 1 wherein said removable part has a wall provided with a jacket in which a high vacuum is maintained.

9. An apparatus for exchanging heat between two fluids comprising, in combination, a permanently closed high vacuum container, an auxiliary vacuum container connected to said high vacuum container and having a removable part for providing access to the interior of said auxiliary vacuum container, said containers having a common wall portion, conduit means for each of the heat exchanging fluids, each conduit means consecutively extending from the outside into said high vacuum container, from the latter into said auxiliary container, thereupon back into said high vacuum container and therefrom to the outside, the parts of said conduit means in said high vacuum container having portions placed in heat exchange relation, the heat exchanging portion of one of said conduit means being placed within and permanently leakproof connected to the heat exchanging portion of the second conduit means, and control and service devices interposed in the parts of said conduit means in said auxiliary container.

References Cited in the file of this patent

UNITED STATES PATENTS

| 927,594 | Place | July 13, 1909 |
| 1,876,047 | Edmonds | Sept. 6, 1932 |
| 2,076,235 | Hayes et al. | Apr. 6, 1937 |
| 2,151,299 | Miller | Mar. 21, 1939 |
| 2,907,177 | Daley | Oct. 6, 1959 |

FOREIGN PATENTS

| 7,773 | Great Britain | of 1898 |
| 15,235 | Great Britain | of 1899 |